(12) United States Patent
Romain (10) Patent No.: US 11,575,402 B2
(45) Date of Patent: Feb. 7, 2023

(54) ELECTRONIC DEVICE

(71) Applicant: STMicroelectronics (Rousset) SAS, Rousset (FR)

(72) Inventor: Fabrice Romain, Rians (FR)

(73) Assignee: STMicroelectronics (Rousset) SAS, Rousset (FR)

(*) Notice: Subject to any disclaimer, the term of this patent is extended or adjusted under 35 U.S.C. 154(b) by 0 days.

(21) Appl. No.: 17/452,521

(22) Filed: Oct. 27, 2021

(65) Prior Publication Data

US 2022/0190862 A1 Jun. 16, 2022

(30) Foreign Application Priority Data

Dec. 14, 2020 (FR) ........................ 2013184

(51) Int. Cl.
*H04B 1/3816* (2015.01)
*G06K 19/077* (2006.01)

(52) U.S. Cl.
CPC ..... *H04B 1/3816* (2013.01); *G06K 19/07743* (2013.01)

(58) Field of Classification Search
CPC .................................................. H04B 1/3816
See application file for complete search history.

(56) References Cited

U.S. PATENT DOCUMENTS

| | | | | |
|---|---|---|---|---|
| 2001/0035744 A1* | 11/2001 | Chen | ............... | H02M 1/4225 323/282 |
| 2006/0063565 A1* | 3/2006 | Ueno | ............... | H04M 1/0214 455/557 |
| 2010/0279737 A1 | 11/2010 | Joppek et al. | | |
| 2011/0237297 A1* | 9/2011 | Shin | ............... | H04W 76/10 455/558 |
| 2013/0260830 A1 | 10/2013 | Zhao et al. | | |
| 2014/0045489 A1 | 2/2014 | Josso | | |

FOREIGN PATENT DOCUMENTS

| EP | 2159666 A1 | 3/2010 |
|---|---|---|
| EP | 2244528 A1 | 10/2010 |

* cited by examiner

*Primary Examiner* — Hsinchun Liao
(74) *Attorney, Agent, or Firm* — Slater Matsil, LLP (57) ABSTRACT

The present description concerns an electronic device including: a modulator-demodulator circuit; a first integrated circuit implementing a first subscriber identification module; and at least one second integrated circuit intended to implement a second subscriber identification module, wherein a sequencing terminal of the first circuit and a sequencing terminal of the second circuit are connected to a same sequencing terminal of the modulator-demodulator circuit.

20 Claims, 4 Drawing Sheets

ELECTRONIC DEVICE

CROSS-REFERENCE TO RELATED APPLICATIONS

This application claims priority to French Application No. FR 2013184, filed on Dec. 14, 2020, which application is hereby incorporated herein by reference.

TECHNICAL FIELD

The present disclosure generally concerns electronic devices. The present disclosure more particularly concerns wireless communication devices implementing a plurality of subscriber identity modules or universal integrated circuit cards (SIM or UICC).

BACKGROUND

Wireless communication devices comprising a plurality of integrated circuits each implementing a subscriber identification module are known. Some of these circuits may form part of a removable microcircuit card, or SIM card, inserted by a user in a dedicated location, or slot, of the device. Other circuits may form part of an irremovable electronic chip, welded in factory on a printed circuit board of the device.

The presence of a plurality of these circuits, removable or not, in a same device enables the user to access extended wireless communication functionalities. However, the integration of such circuits causes a complexity and cost increase of the devices.

SUMMARY

There is a need to improve current wireless communication electronic devices implementing a plurality of subscriber identification modules.

An embodiment overcomes all or part of the disadvantages of known wireless communication electronic devices implementing a plurality of subscriber identification modules.

An embodiment provides an electronic device comprising: a modulator-demodulator circuit; a first integrated circuit implementing a first subscriber identification module; and at least one second integrated circuit intended to implement a second subscriber identification module, wherein a sequencing terminal of the first circuit and a sequencing terminal of the second circuit are connected to a same sequencing terminal of the modulator-demodulator circuit.

According to an embodiment, a reset terminal of the first circuit and a reset terminal of the second circuit are connected to a same reset terminal of the modulator-demodulator circuit.

According to an embodiment, a data transmit-receive terminal of the second circuit is connected to a first data transmit-receive terminal of the first circuit.

According to an embodiment, a second data transmit-receive terminal of the first circuit is connected to a data transmit-receive terminal of the modulator-demodulator circuit.

According to an embodiment, the first circuit comprises a switch coupling the first data transmit-receive terminal to the second data transmit-receive terminal.

According to an embodiment, the device further comprises a microcontroller transmitting a signal for controlling the switch.

According to an embodiment, the sequencing and reset terminals of the modulator-demodulator circuit and of the first and second circuits each form part of a standardized ISO 7816 communication interface.

According to an embodiment, the first circuit is an embedded universal integrated circuit card.

According to an embodiment, the first circuit is an integrated universal integrated circuit card.

According to an embodiment, the second circuit defines a slot intended to receive a universal integrated circuit card.

An embodiment provides a cell phone comprising a device such as described.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail. In particular, the generation of the wireless communication signals and the interpretation thereof have not been detailed, the described embodiments being compatible with usual techniques of generation and interpretation of these signals.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following description, when reference is made to terms qualifying absolute positions, such as terms "front", "back", "top", "bottom", "left", "right", etc., or relative positions, such as terms "above", "under", "upper", "lower", etc., or to terms qualifying directions, such as terms "horizontal", "vertical", etc., unless otherwise specified, it is referred to the orientation of the drawings.

Unless specified otherwise, the expressions "around", "approximately", "substantially" and "in the order of" signify within 10%, and preferably within 5%.

Figure 1:
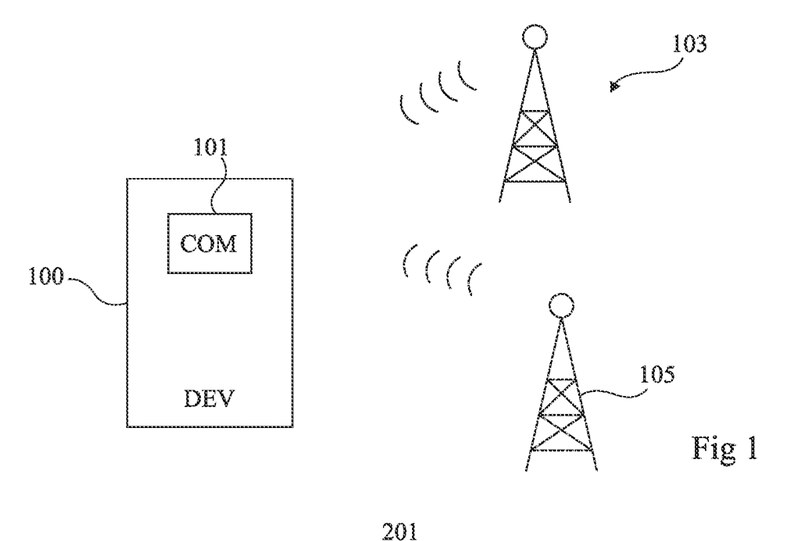
FIG. 1 schematically shows in the form of blocks an example of a wireless communication system of the type to which the described embodiments apply as an example.

FIG. 1 schematically shows in the form of blocks, an example of a wireless communication system of the type to which the described embodiments apply as an example.

In the shown example, the system comprises an electronic wireless communication device 100 (DEV). Device 100 is for example a radio frequency communication device. Device 100 comprises, in this example, a wireless communication circuit 101 (COM). Circuit 101 for example enables device 100 to receive and to transmit data over a first communication network, symbolized in FIG. 1 by an antenna 103. As an example, device 100 forms part of a motor vehicle, of a cell phone, of a touch pad, of a connected object, etc.

As illustrated in FIG. 1, communication circuit 101 may further enable device 100 to receive and to transmit data over a second communication network, symbolized in FIG. 1 by another antenna 105. As an example, the antennas of first and second communication networks 103 and 105 each form part of a different telecommunication infrastructure. These infrastructures are for example operated by different operators.

Generally, each communication network 103, 105 for example enables device 100 to communicate with other devices, not shown in FIG. 1. These other devices are for example similar to device 100.

Device 100 for example exchanges data with one and the other of networks 103 and 105, in alternation. This for example enables device 100 to transmit and to receive data, messages, phone calls, etc. by using either network 103, or network 105. As an example, this enables device 100 to communicate by using one of networks 103, 105 in case of an unavailability of the other network 105, 103.

Figure 2:
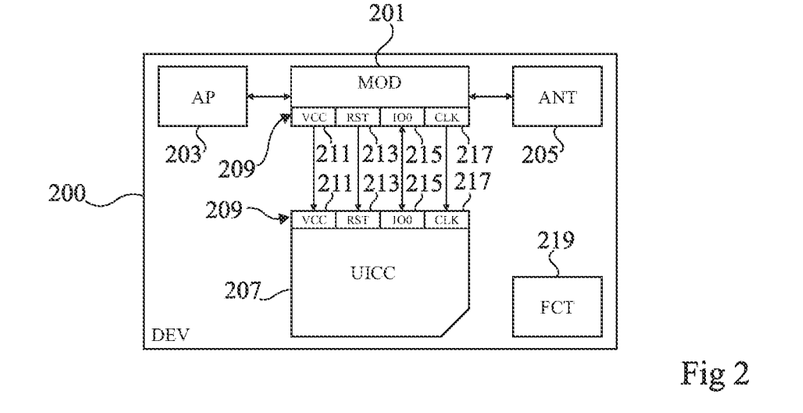
FIG. 2 schematically shows in the form of blocks an example of an electronic wireless communication device.

FIG. 2 schematically shows in the form of blocks, an example of an electronic wireless communication device 200 (DEV) of the type of the device 100 of FIG. 1. FIG. 2 more precisely illustrates the case of a device comprising a single circuit adapted to implementing a subscriber identity module or universal integrated circuit card (SIM or UICC).

In the shown example, device 200 comprises a modulator-demodulator circuit 201 (MOD) or modem. Modem 201 is for example coupled to a microprocessor 203 (AP) of device 200. Microprocessor 203 is for example a main application processor of device 200. As an example, microprocessor 203 is welded to a printed circuit board (not shown), for example, a motherboard, of device 200. Modem 201 is for example also welded on the motherboard of device 200.

In the shown example, modem 201 is further coupled to an antenna 205 (ANT) of device 200. Antenna 205 is for example a radio frequency antenna, capable of transmitting and or receiving communication signals over one or a plurality of frequency bands. Although this has not been shown in FIG. 2, antenna 205 is for example coupled to modem 201 by an impedance matching circuit. Further, device 200 may comprise at least one electromagnetic filter (not shown), configured to attenuate or remove electromagnetic disturbances likely to affect signals received or transmitted by antenna 205.

In the shown example, modem 201 is connected to an integrated circuit 207 (UICC). Modem 201 and integrated circuit 207 for example each comprise a communication interface 209. The communication interfaces 209 of modem 201 and of circuit 207 are for example connected to each other, for example by conductive tracks of the printed circuit board of device 200. As an example, the communication interfaces 209 of modem 201 and of integrated circuit 207 are standardized ISO 7816 communication interfaces.

In this example, each communication interface 209 comprises: a power supply terminal 211 (VCC); a reset terminal 213 (RST); a data transmit-receive terminal 215 (10o); and a sequencing terminal 217 (CLK).

In the shown example, modem 201 and circuit 207 exchange signals and data via their respective communication interfaces 209. For a communication between modem 201 and integrated circuit 207, the interface 209 of modem 201 is for example configured as a master interface while the interface 209 of circuit 207 is configured as a slave interface.

More particularly, in the shown example: the terminal 211 of interface 209 of modem 201 is configured to apply a power supply signal VCC onto the terminal 211 of the interface 209 of circuit 207; the terminal 213 of the interface 209 of modem 201 is configured to apply a reset signal RST to the terminal 213 of the interface 209 of circuit 207; the terminal 215 of the interface 209 of modem 201 is configured to transmit data signals IOo to the terminal 215 of the interface 209 of circuit 207 and to receive data signals IOo transmitted by the terminal 215 of the interface 209 of circuit 207; and the terminal 217 of the interface 209 of modem 201 is configured to apply a sequencing or clock signal CLK to the terminal 217 of the interface 209 of circuit 207.

The integrated circuit 207 of device 200 is for example a location, slot or housing intended to receive a removable microcircuit card. This microcircuit card is for example a universal integrated circuit card (UICC), also called subscriber identity module (SIM) or, more simply, SIM card. In this case, integrated circuit 207 for example comprises contacting elements (not shown) enabling to connect pads of the SIM card to the terminals 211, 213, 215, and 217 of the interface 209 of circuit 207.

The SIM card is for example supplied independently from device 200. As an example, the SIM card is obtained by a user of device 200 by a telecommunication operator, for example, the operator of the network 103 of FIG. 1. The SIM card is then for example inserted into slot 207 by the user, to enable device 200 to communicate by using network 103.

To enable device 200 to communicate by using another network, for example, the network 105 of FIG. 1, the user for example has to acquire another SIM card. This other SIM card is for example supplied by the telecommunication operator operating network 105. By for example replacing the SIM card of the operator of network 103 with that of the operator of network 105 in slot 207, the user then enables device 200 to communicate by using network 105.

As a variant, integrated circuit 207 is a non-removable circuit implementing a subscriber identification module. Circuit 207 is then for example an embedded universal integrated circuit card (eUICC), also called embedded subscriber identity module (eSIM). In this case, integrated circuit 207 for example forms part of an electronic chip attached to a printed circuit board (not shown) of device 200. As an example, the electronic chip comprising circuit 207 is welded on the motherboard of device 200. Integrated circuit 207 may alternately be an integrated universal integrated circuit card (iUICC), also called integrated subscriber identity module (iSIM). In this case, integrated circuit 207 for example forms part of the microprocessor 203 of device 200.

In the variant where integrated circuit 207 is a non-removable embedded or integrated universal integrated circuit card, circuit 207 is present in device 200 after manufacturing. To enable device 200 to communicate by for example using the network 103 of FIG. 1, a SIM profile is for example stored in a memory area (not shown) of circuit 207. This SIM profile is for example downloaded by the user of device 200 from a data server operated by the operator of network 103.

To enable device 200 to communicate by using another network, for example, the network 105 of FIG. 1, the user for example has to download another SIM profile. This other SIM profile is for example made available to the user by the telecommunication operator operating network 105. By for example storing the SIM profile of the operator of network 105 into the memory of circuit 207, the user then enables device 200 to communicate by using network 105. According, in particular, to a memory capacity of circuit 207, the SIM profile of the operator of network 105 may be stored in the slot or as a complement to the SIM profile of the operator of network 103.

Device 200 may further comprise one or a plurality of other elements. These elements are symbolized, in FIG. 2, by a functional block 219 (FCT).

Figure 3:
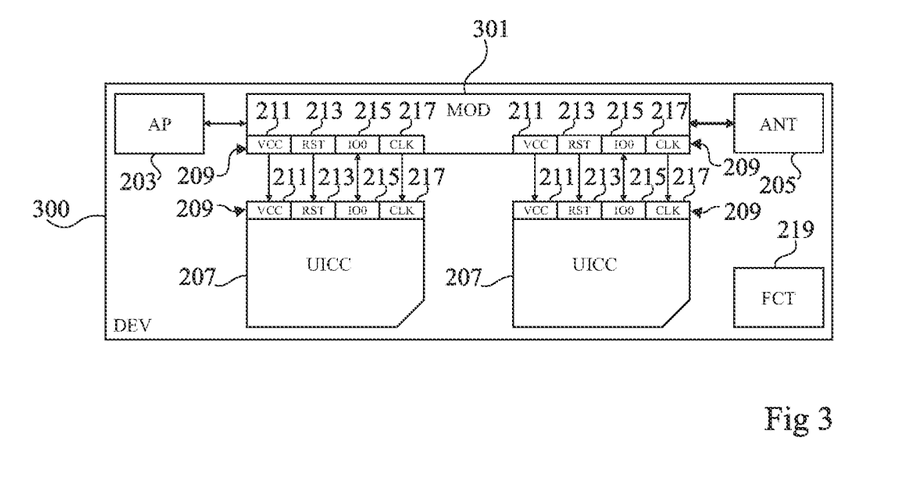
FIG. 3 schematically shows in the form of blocks another example of an electronic wireless communication device.

FIG. 3 schematically shows in the form of blocks another example of an electronic wireless communication device 300 (DEV) of the type of the device 100 of FIG. 1. FIG. 3 more precisely illustrates the case of a device comprising two circuits adapted to each implementing a subscriber identification module.

The device 300 of FIG. 3 comprises elements common with the device 200 of FIG. 2. Such common elements will not be detailed again hereafter. The device 300 of FIG. 3 differs from the device 200 of FIG. 2 mainly in that device 300 comprises, instead of modem 201, a modem 301 (MOD) comprising two communication interfaces 209.

In the shown example, the modem 301 of device 300 is connected to two integrated circuits 207 (UICC). One of the communication interfaces 209 of modem 301 is for example connected to the communication interface 209 of one of integrated circuits 207, while the other communication interface 209 of modem 301 is connected to the communication interface 209 of the other integrated circuit 207.

More particularly, in the shown example: the terminals 211, 213, 215, and 217 of one of the interfaces 209 of modem 301 are respectively connected to the terminals 211, 213, 215, and 217 of the interface 209 of one of circuits 207; and the terminals 211, 213, 215, and 217 of the other interface 209 of modem 301 are respectively connected to the terminals 211, 213, 215, and 217 of the interface 209 of the other circuit 207.

The communication interfaces 209 of modem 301 are for example connected to the communication interfaces 209 of circuits 207 by conductive tracks of a printed circuit card of device 300. As an example, the communication interfaces 209 of modem 301 are standardized ISO 7816 communication interfaces.

In the shown example, modem 301 and circuits 207 exchange signals and data via their respective communication interfaces 209. For a communication between modem 301 and integrated circuits 207, the interfaces 209 of modem 301 are for example configured as master interfaces while the interface 209 of each circuit 207 is configured as a slave interface.

More particularly, in the shown example: the terminals 211, 213, and 217 of each interface 209 of modem 301 are configured to apply signals VCC, RST, and CLK to the terminals 211, 213, and 217 of the interface 209 of the circuit 207 to which they are respectively connected; and the terminal 215 of each interface 209 of modem 301 is configured to transmit data signals IOo to the terminal 215 of the interface 209 of the circuit 207 to which it is connected and to receive the data signals IOo transmitted by the terminal 215 of the interface 209 of the circuit 207 to which it is connected.

According for example to the targeted application, each circuit 207 may, as previously discussed in relation with FIG. 2, receive a SIM card or store a SIM profile. As an example, one of the circuits 207 of device 300 receives a SIM card, or stores a SIM profile, enabling to access a network different from a network capable of being used due to a SIM card inserted into, or a SIM profile stored in, the other circuit 207. One of circuits 207 for example implements a subscriber identification module enabling device 300 to communicate by using the network 103 of FIG. 1. The other circuit 207 for example implements a subscriber identification module enabling device 300 to communicate by using the network 105 of FIG. 1.

A disadvantage of device 300 lies in the fact that modem 301 comprises two communication interfaces 209. These two interfaces 209 cause a size, complexity, and cost increases of modem 301, and thus of device 300.

Figure 4:
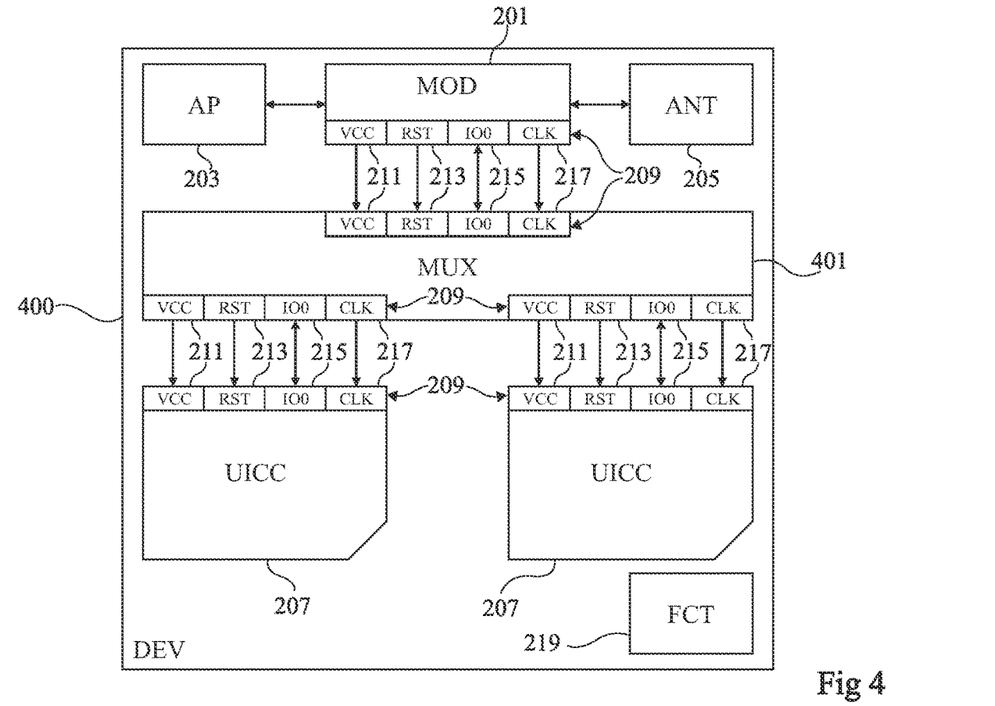
FIG. 4 schematically shows in the form of blocks still another example of an electronic wireless communication device.

FIG. 4 schematically shows in the form of blocks still another example of an electronic wireless communication device 400 (DEV) of the type of the device 100 of FIG. 1. FIG. 4 more particularly illustrates the case of a device comprising a modem coupled, by a multiplexer, to two circuits adapted to each implementing a subscriber identification module.

The device 400 of FIG. 4 comprises elements common with the device 200 of FIG. 2. Such common elements will not be detailed again hereafter. The device 400 of FIG. 4 differs from the device 200 of FIG. 2 mainly in that device 400 comprises a multiplexer 401 (MUX) and two integrated circuits 207 (UICC).

In the shown example, the modem 201 (MOD) of device 400 is connected to multiplexer 401. Multiplexer 401 for example comprises three communication interfaces 209. As illustrated in FIG. 4, multiplexer 401 for example comprises an interface 209 connected to the interface 209 of modem 201 and two other interfaces 209 each connected to the interface 209 of one of integrated circuits 207.

More particularly, in the shown example: the terminals 211, 213, 215, and 217 of one of the interfaces 209 of multiplexer 401 are respectively connected to the terminals 211, 213, 215, and 217 of the interface 209 of modem 201; the terminals 211, 213, 215, and 217 of each of the other interfaces 209 of multiplexer 401 are respectively connected to the terminals 211, 213, 215, and 217 of the interface 209 of one of circuits 207.

The communication interfaces 209 of multiplexer 401 are for example connected to the communication interfaces 209 of modem 201 and of circuits 207 by conductive tracks of a printed circuit board of device 400. As an example, the communication interfaces of multiplexer 401 are standardized ISO 7816 communication interfaces.

In the shown example, modem 201 and circuits 207 exchange signals and data via multiplexer 400. For a communication between modem 201 and integrated circuits 207, the interface 209 of modem 301 and the interfaces 209 of multiplexer 401 connected to circuits 207 are for example configured as master interfaces while the interface 209 of the multiplexer connected to modem 201 and the interface 209 of each circuit 207 are configured as slave interfaces.

More particularly, in the shown example: the terminals 211, 213, and 217 of the interface 209 of modem 201 are configured to apply signals VCC, RST, and CLK to the terminals 211, 213, and 217 of the interface 209 of the multiplexer 401 connected to modem 201; the terminal 215 of the interface 209 of modem 201 is configured to transmit data signals IOo to the terminal 215 of the interface 209 of multiplexer 401 connected to modem 201 and to receive the data signals IOo transmitted by the terminal 215 of the interface 209 of multiplexer 401 connected to modem 201; the terminals 211, 213, and 217 of the interface 209 of multiplexer 401 connected to one of circuits 207 are configured to apply signals VCC, RST, and CLK to the terminals 211, 213, and 217 of the interface 209 of the associated circuit 207; the terminal 215 of each interface 209 of multiplexer 401 connected to one of circuits 207 is configured to transmit data signals IOo to the terminal 215 of the interface 209 of the associated circuit 207 and to receive the data signals IOo transmitted by the terminal 215 of the interface 209 of the associated circuit 207.

As an example, multiplexer 401 is adapted to directing signals VCC, RST, 10o, and CLK towards one or the other of the circuits 207 of device 400, for example, according to a control signal (not shown). This control signal is for example transmitted to multiplexer 401 by microprocessor 203 (AP). Multiplexer 401 is for example configured to enable modem 201 to exchange data signals IOo with one or the other of circuits 207, for example, in alternation. In this case, multiplexer 401 for example transmits the signals IOo received from modem 201 to one or the other of circuits 207 according to the control signal.

As a variant, multiplexer 401 is for example configured to enable modem 201 to exchange data signals IOo with the two circuits 207, for example, simultaneously. In this case, multiplexer 401 is for example configured to demultiplex the signals IOo received from modem 201, and then to transmit these demultiplexed signals to each circuit 207. Multiplexer 401 is for example further configured to multiplex the signals IOo received from circuits 207, and then to transmit these multiplexed signals to modem 201.

A disadvantage of device 400 lies in the fact that circuits 207 are coupled to modem 201 via multiplexer 401. The presence of multiplexer 401 causes an increase in the complexity, size, and cost of device 400.

Figure 5:
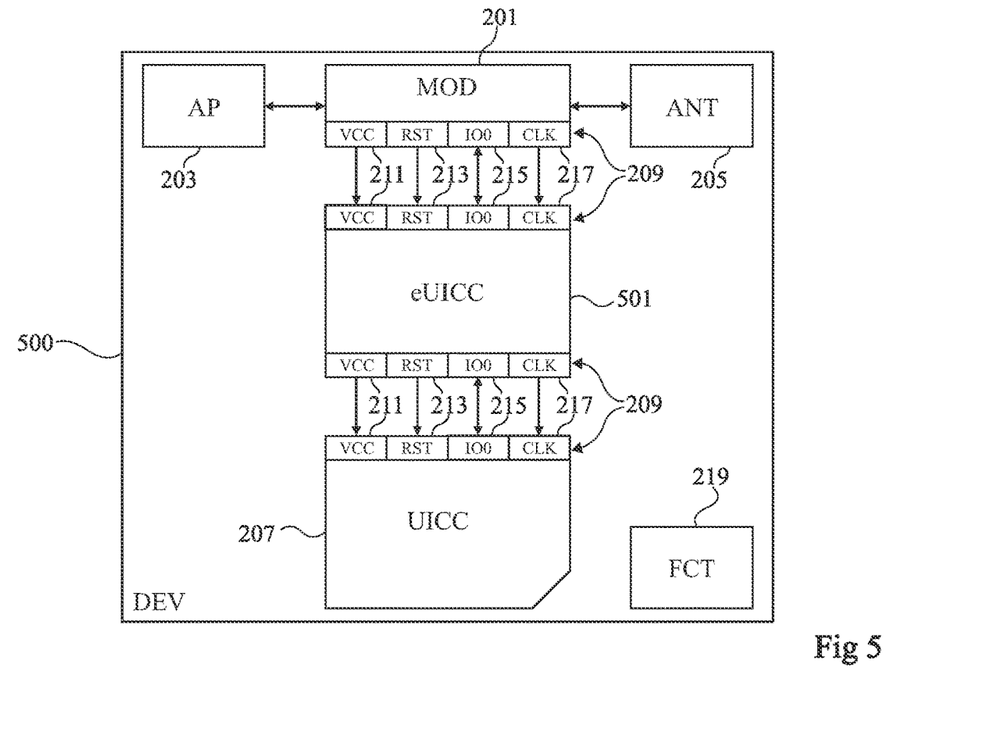
FIG. 5 schematically shows in the form of blocks still another example of an electronic wireless communication device.

FIG. 5 schematically shows in the form of blocks still another example of an electronic wireless communication device 500 (DEV) of the type of the device 100 of FIG. 1. FIG. 5 more particularly illustrates the case of a device comprising two circuits adapted to each implementing a subscriber identification module, one of the circuits being coupled to a modem by the other circuit.

The device 500 of FIG. 5 comprises elements common with the device 200 of FIG. 2. Such common elements will not be detailed again hereafter. The device 500 of FIG. 5 differs from the device 200 of FIG. 2 mainly in that the integrated circuit 207 (UICC) of device 500 is coupled to modem 201 (MOD) via another integrated circuit 501 (eUICC).

In the shown example, modem 201 and circuit 207 of device 500 are each connected to circuit 501. Circuit 501 for example comprises two communication interfaces 209 similar to those of modem 201 and of circuit 207. One of the communication interfaces 209 of circuit 501 is for example connected to the communication interface 209 of modem 201. The other communication interface 209 of circuit 501 is for example connected to the communication interface 209 of integrated circuit 207.

More particularly, in the shown example: the terminals 211, 213, 215, and 217 of one of the interfaces 209 of circuit 501 are respectively connected to the terminals 211, 213, 215, and 217 of the interface 209 of modem 201; and the terminals 211, 213, 215, and 217 of the other interface 209 of circuit 501 are respectively connected to the terminals 211, 213, 215, and 217 of the interface 209 of circuit 207.

The communication interfaces 209 of circuit 501 are for example connected to the communication interfaces 209 of modem 201 and of circuits 207 by conductive tracks of a printed circuit board of device 500. As an example, the communication interfaces 209 of multiplexer 501 are standardized ISO 7816 communication interfaces.

In the shown example, modem 201 and circuits 501, 207 exchange signals and data via their respective communication interfaces 209. For a communication between modem 201 and integrated circuits 501, 207, the interface 209 of modem 201 and the interface 209 of circuit 501 connected to circuit 207 are for example configured as master interfaces. The interface 209 of circuit 501 connected to modem 201 and the interface 209 of circuit 207 are for example configured as slave interfaces.

More particularly, in the shown example: the terminals 211, 213, and 217 of the interface 209 of modem 201 are configured to apply signals VCC, RST, and CLK to the terminals 211, 213, and 217 of the interface 209 of the circuit 501 to which they are respectively connected; and the terminal 215 of the interface 209 of modem 201 is configured to transmit data signals IOo to the terminal 215 of the interface 209 of the circuit 501 to which it is connected and to receive the data signals IOo transmitted by the terminal 215 of the interface 209 of the circuit 501 to which it is connected.

Further, in the shown example: the terminals 211, 213, and 217 of the interface 209 of circuit 501 connected to circuit 207 are configured to apply signals VCC, RST, and CLK to the terminals 211, 213, and 217 of the interface 209 of the circuit 207 to which they are respectively connected; and the terminal 215 of the interface 209 of the circuit 501 connected to circuit 207 is configured to transmit data signals IOo to the terminal 215 of the interface 209 of circuit 207 and to receive the data signals IOo transmitted by the terminal 215 of the interface 209 of circuit 501.

According for example to the targeted application, each circuit 501, 207 may, as previously discussed in relation with FIG. 2, receive a SIM card or store a SIM profile. Circuit 501 is for example an embedded universal integrated circuit card, eUICC. Circuit 207 is for example a slot intended to receive a SIM card. As an example, circuit 501 stores a SIM profile, enabling to access a network different from the network capable of being used due to a SIM card inserted in circuit 207. Circuit 501 for example implements a subscriber identification module enabling device 500 to communicate by using the network 103 of FIG. 1. The other circuit 207 is for example intended to implement a subscriber identification module enabling device 500 to communicate by using the network 105 of FIG. 1.

As an example, circuit 501 is adapted to processing signals VCC, RST, 10o, and CLK received from modem 201 or to transmitting these signals to circuit 207, for example according to a control signal, not shown. This control signal is for example transmitted to circuit 501 by microprocessor 203 (AP). Circuit 501 is for example configured to enable modem 201 to exchange data signals IOo with one or the other of circuits 501, 207, for example, in alternation Circuit 501 for example acts as a communication bridge between the modem 201 and the circuit 207 of device 500.

A disadvantage of device 500 lies in the fact that circuit 501 comprises an interface 209 configured as a master for the communication with circuit 207. The presence of this interface causes an increase in the size, complexity, and cost of circuit 501, and thus of device 500. Further, such an interface requires a software programming which is difficult to perform.

Figure 6:
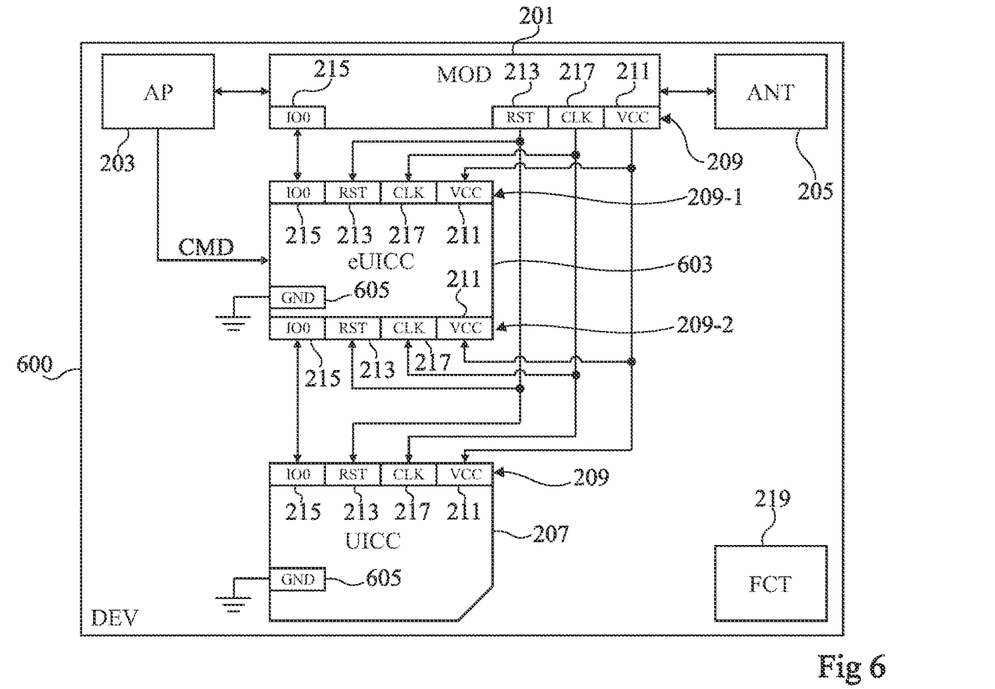
FIG. 6 schematically shows in the form of blocks an embodiment of an electronic wireless communication device.

FIG. 6 schematically shows in the form of blocks an embodiment of an electronic wireless communication device 600 (DEV) of the type of the device 100 of FIG. 1. FIG. 6 more particularly illustrates the case of a device comprising two circuits adapted to each implementing a subscriber identification module, these circuits being coupled to a same communication interface of a modem.

The device 600 of FIG. 6 comprises elements common with the device 200 of FIG. 2. Such common elements will not be detailed again hereafter. The device 600 of FIG. 6 differs from the device 200 of FIG. 2 mainly in that device 600 comprises, in addition to integrated circuit 207 (UICC), another integrated circuit 603 (eUICC) connected to modem 201 (MOD).

In the shown example, the integrated circuits 603 and 207 of device 600 are each connected to modem 201. Circuit 603 for example comprises two communication interfaces 209-1 and 209-2, for example, similar to the interfaces 209 of modem 201 and of circuit 207. One of the communication interfaces 209 (209-1 209-2) of circuit 603, for example, interface 209-1, is connected to the communication interface 209 of modem 201. The other communication interface 209-2 of circuit 603 is for example connected, except for its terminal 215, to the communication interface 209 of modem 201. The communication interface 209 of circuit 207 is for example connected, except for its terminal 215, to the communication interface 209 of modem 201.

More particularly, in the shown example: the terminals 211, 213, 215, and 217 of the interface 209 of modem 201 are respectively connected to the terminals 211, 213, 215, and 217 of the interface 209-1 of circuit 603; the terminals 211, 213, and 217 of the interface 209 of modem 201 are respectively connected to the terminal 211, 213, and 217 of the interface 209-2 of circuit 603; and the terminals 211, 213, and 217 of the interface 209 of modem 201 are respectively connected to the terminals 211, 213, and 217 of the interface 209 of circuit 207.

The communication interface 209 of modem 201 is for example connected to the communication interfaces 209-1 and 209-2 of circuit 603 and to the communication interface 209 of circuit 207 by conductive tracks of a printed circuit board of device 600. As an example, the communication interfaces 209-1 and 209-2 of integrated circuit 603 are standardized ISO 7816 communication interfaces.

In the shown example, modem 201 and circuits 603, 207 exchange signals and data via their respective communication interfaces 209, 209-1, 209-2. For a communication between modem 201 and integrated circuits 603, 207, the interface 209 of modem 201 is for example configured as a master interface. The interfaces 209-1 and 209-2 of circuit 603 and the interface 209 of circuit 207 are for example configured as slave interfaces.

More particularly, in the shown example: the terminals 211, 213, and 217 of the interface 209 of modem 601 are configured to apply signals VCC, RST, and CLK to the terminals 211, 213, and 217 of the interfaces 209-1 and 209-2 of circuit 603 and to the terminals 211, 213, and 217 of the interface 209 of the circuit 207 to which they are respectively connected; the terminal 215 of the interface 209 of modem 201 is configured to transmit data signals IOo to the terminal 215 of the interface 209 of the circuit 603 to which it is connected and to receive the data signals IOo transmitted by the terminal 215 of the interface 209-1 of the circuit 603 to which it is connected; the terminal 215 of the interface 209-2 of circuit 603 is configured to transmit data signals IOo to the terminal 215 of the interface 209 of the circuit 207 to which it is connected and to receive the data signals IOo transmitted by the terminal 215 of the interface 209 of the circuit 207 to which it is connected.

In the shown example, each integrated circuit 603, 207 further comprises a terminal 605 (GND) taken to a reference potential, for example, the ground.

Integrated circuit 603 for example comprises receive and transmit buffers (not shown). More particularly, circuit 603 for example comprises: a receive buffer and a transmit buffer associated with interface 209-1; and another receive buffer and another transmit buffer associated with interface 209-2.

As an example, during a communication using circuit 207, data or control signals received by the terminal 215 of interface 209-1 are stored in the receive buffer of interface 209-1. These data or control signals are then transferred or copied, for example, by a software of circuit 603, into the transmit buffer of interface 209-2 and then transmitted, by terminal 215 of interface 209-2, to circuit 207. Similarly, data or control signals received by the terminal 215 of interface 209-2 are stored in the receive buffer of interface 209-2. These data or control signals are then transferred or copied, for example, by the software of circuit 603, into the transmit buffer of interface 209-1 and then transmitted, by terminal 215 of interface 209-1, to modem 201. As a variant, the data or control signals may be transferred between the buffers of circuit 603 by a hardware direct memory access (DMA) component of circuit 603.

The transfer of the data or control signals between the buffers of circuit 603 is for example conditioned by a control signal CMD transmitted by microprocessor 203 (AP). As an example, control signal CMD is a binary signal having a first state allowing the transfer of the data or control signals between the buffers of circuit 603 and having a second state inhibiting the transfer of the data or control signals between the buffers of circuit 603. The first state for example corresponds to a case where device 600 communicates by using circuit 207, and circuit 603 is then not used to communicate. The second state for example corresponds to another case where device 600 communicates by using circuit 603, and circuit 207 is then for example not used to communicate.

As a variant, control signal CMD is transmitted by modem 201. As an example, signal CMD is transmitted by a universal input-output terminal (not shown) of modem 201.

According for example to the targeted application, each circuit 603, 207 of device 600 may, as previously discussed in relation with FIG. 2, receive a SIM card or store a SIM profile. Circuit 603 is for example an embedded universal circuit card, eUICC. Circuit 207 for example defines a slot intended to receive a SIM card. As an example, circuit 603 stores a SIM profile, enabling to access a network different from the network capable of being used due to a SIM card inserted in circuit 207. Circuit 603 for example implements a subscriber identification module enabling device 600 to communicate by using the network 103 of FIG. 1. The other circuit 207 is for example intended to implement a subscriber identification module enabling device 600 to communicate by using the network 105 of FIG. 1.

The device 600 of FIG. 6 differs from the device 500 of FIG. 5 particularly in that the circuit 603 of device 600 comprises no communication interface 209 configured as a master, conversely to circuit 501.

An advantage of the embodiment discussed hereabove in relation with FIG. 6 lies in the fact that device 600 is less complex, less expensive, and less bulky, particularly as compared with device 400 and 500.

Figure 7:
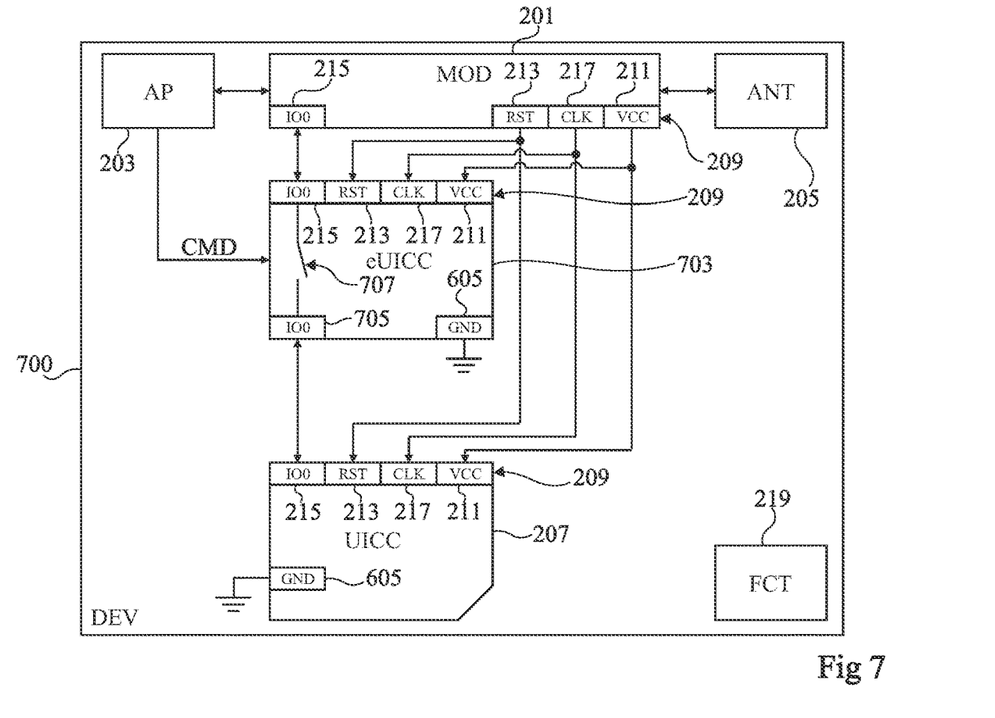
FIG. 7 schematically shows in the form of blocks another embodiment of an electronic wireless communication device.

FIG. 7 schematically shows in the form of blocks another embodiment of an electronic wireless communication device 700 (DEV) of the type of the device 100 of FIG. 1. FIG. 7 more particularly illustrates the case of a device comprising two circuits adapted to each implementing a subscriber identification module, these circuits being coupled to a same communication interface of a modem.

The device 700 of FIG. 7 comprises elements common with the device 600 of FIG. 6. Such common elements will not be detailed again hereafter. The device 700 of FIG. 7 differs from the device 600 of FIG. 6 mainly in that device 700 comprises, instead of circuit 603, a circuit 703 (eUICC).

In the shown example, circuit 703 comprises a single communication interface 209, for example, similar to the communication interface 209-1 of circuit 603. Circuit 703 for example corresponds to a circuit similar to circuit 603 which would not comprise communication interface 209-2 or with a communication interface 209-2 which would not be connected to modem 201.

More particularly, in the shown example: the terminals 211, 213, 215, and 217 of the interface 209 of modem 201 are respectively connected to the terminals 211, 213, 215, and 217 of the interface 209 of circuit 703; and the terminals 211, 213, and 217 of the interface 209 of modem 201 are respectively connected to the terminals 211, 213, and 217 of the interface 209 of circuit 207.

The communication interface 209 of modem 201 is for example connected to the communication interfaces 209 of circuit 603 and 207 by conductive tracks of a printed circuit board of device 700. As an example, the communication interface 209 of integrated circuit 703 is a standardized ISO 7816 communication interface.

In the shown example, modem 201 and circuits 703, 207 exchange signals and data via their respective communication interfaces 209. For a communication between modem 201 and integrated circuits 703, 207, the interface 209 of modem 201 is for example configured as a master interface. The interfaces 209 of circuits 703, 207 are for example configured as slave interfaces.

More particularly, in the shown example: the terminals 211, 213, and 217 of the interface 209 of modem 601 are configured to apply signals VCC, RST, and CLK to the terminals 211, 213, and 217 of the interface 209 of the circuit 703, 207 to which they are respectively connected; the terminal 215 of the interface 209 of modem 201 is configured to transmit data signals IOo to the terminal 215 of the interface 209 of the circuit 703 to which it is connected and to receive the data signals IOo transmitted by the terminal 215 of the interface 209 of the circuit 703 to which it is connected.

Further, in the shown example, a terminal 705 of circuit 703 is configured to transmit data signals IOo to the terminal 215 of the interface 209 of the circuit 207 to which it is connected and to receive the data signals IOo transmitted by the terminal 215 of the interface 209 of the circuit 207 to which it is connected. As an example, terminal 705 is an input-output terminal, for example, universal, of circuit 703. As a variant, terminal 705 corresponds to a data transmit-receive terminal forming part of another communication interface (not shown) similar to the interface 209 of circuit 703, the other terminals of which are not connected.

In the shown example, circuit 703 further comprises a switch 707. Switch 707 is for example configured to connect the terminal 215 of the interface 209 of circuit 703 to terminal 705 according to the state of the control signal CMD received from microprocessor 203 (AP). The first state of signal CMD for example corresponds to a case where switch 707 is on. Device 700 then communicates by using circuit 207, where circuit 703 is for example not used to communicate. The second state of signal CMD for example corresponds to another case where switch 707 is off. Device 700 then communicates by using circuit 703, where circuit 207 is for example not used to communicate.

As compared with device 600, device 700 has the advantage of comprising no connections between modem 201 and the communication interface 209-2 of circuit 603. This further decreases the size, the complexity, and the cost of device 700.

Figure 8:
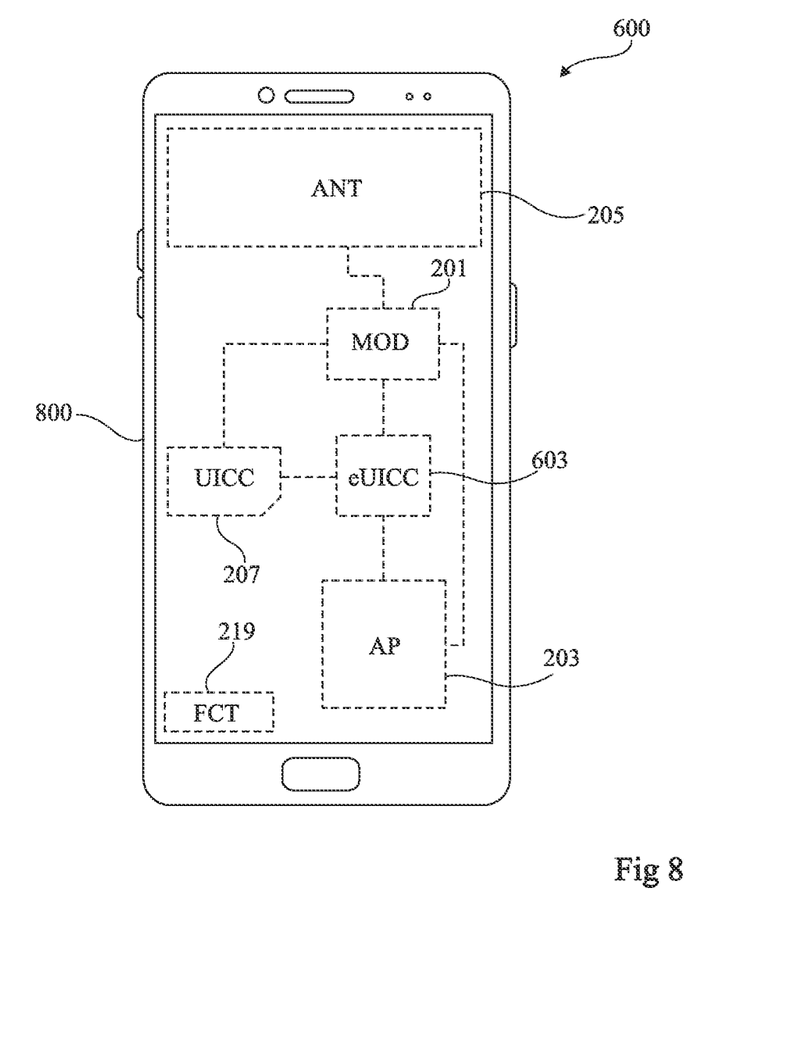
FIG. 8 shows an example of a cell phone comprising an electronic wireless communication device.

FIG. 8 shows an example of a cell phone 800 comprising electronic wireless communication device 600.

In the shown example, the electronic device 600 embedded in cell phone 800 advantageously enables cell phone 800 to communicate by using a plurality of integrated circuits, each implementing a subscriber identification module, while limiting the complexity of the device 600 enabling to access these extended communication functionalities.

Various embodiments and variants have been described. Those skilled in the art will understand that certain features of these various embodiments and variants may be combined, and other variants will occur to those skilled in the art. In particular, although the described embodiments take as an example the case of a cell phone, it will be within the abilities of those skilled in the art to transpose these embodiments to any type of electronic device.

Further, it will be within the abilities of those skilled in the art to combine the embodiments described in relation with FIGS. 6 and 7. It will in particular be within the abilities of those skilled in the art to provide, in the circuit 603 of the device 600 of FIG. 6, a switch similar to the switch 707 of the device 700 of FIG. 7. It will also be within the abilities of those skilled in the art to adapt the circuit 703 of device 700 by replacing switch 707 with buffers similar to those described in relation with FIG. 6 to transfer data or control signals between the terminal 215 of the interface 209 of circuit 703 and terminal 705.

It will also be within the abilities of those skilled in the art to transpose the embodiments described in relation with FIGS. 6 and 7 to any number of circuits 207, for example by providing as many terminals 705 as circuits 207. In this case, switch 707 may for example be adapted to connect the terminal 215 of the interface 209 of circuit 703 to one of terminals 705 or to force an open circuit between the terminal 215 of the interface 209 of circuit 703 and all terminals 705.

Finally, the practical implementation of the described embodiments and variants is within the abilities of those skilled in the art based on the functional indications given hereabove. In particular, it will be within the abilities of those skilled in the art to select, for each integrated circuit 603, 703, 207, the type of circuit to be used among a slot intended to receive a physical UICC (SIM card), an eUICC, and an iUICC, the described embodiments being adaptable to any combination of these types of circuits.

What is claimed is:

1. An electronic device comprising:
   a modulator-demodulator circuit;
   a first integrated circuit implementing a first subscriber identification module; and
   a second integrated circuit configured to receive a second subscriber identification module, wherein a sequencing terminal of the first integrated circuit and a sequencing terminal of the second integrated circuit are coupled to a same sequencing terminal of the modulator-demodulator circuit.

2. The device according to claim 1, wherein a reset terminal of the first integrated circuit and a reset terminal of the second integrated circuit are coupled to a same reset terminal of the modulator-demodulator circuit.

3. The device according to claim 1, wherein a data transmit-receive terminal of the second integrated circuit is coupled to a first data transmit-receive terminal of the first integrated circuit.

4. The device according to claim 3, wherein a second data transmit-receive terminal of the first integrated circuit is coupled to a data transmit-receive terminal of the modulator-demodulator circuit.

5. An electronic device comprising:
a modulator-demodulator circuit;
a first integrated circuit implementing a first subscriber identification module; and
a second integrated circuit configured to receive a second subscriber identification module, wherein a sequencing terminal of the first integrated circuit and a sequencing terminal of the second integrated circuit are coupled to a same sequencing terminal of the modulator-demodulator circuit, wherein a data transmit-receive terminal of the second integrated circuit is coupled to a first data transmit-receive terminal of the first integrated circuit, wherein a second data transmit-receive terminal of the first integrated circuit is coupled to a data transmit-receive terminal of the modulator-demodulator circuit, and wherein the first integrated circuit comprises a switch coupling the first data transmit-receive terminal to the second data transmit-receive terminal.

6. The device according to claim 5, further comprising a microcontroller transmitting a signal (CMD) for controlling the switch.

7. The device according to claim 1, wherein a data transmit-receive terminal of the second integrated circuit is coupled to a first data transmit-receive terminal of the first integrated circuit, and wherein the first integrated circuit comprises a switch coupling the first data transmit-receive terminal to a data transmit-receive terminal of the modulator-demodulator circuit through a second data transmit-receive terminal of the first integrated circuit.

8. The device according to claim 1, wherein the sequencing and reset terminals of the modulator-demodulator circuit and of the first and second integrated circuits each form part of a standardized ISO 7816 communication interface.

9. The device according to claim 1, wherein the first integrated circuit is an embedded universal integrated circuit card.

10. The device according to claim 1, wherein the first integrated circuit is an integrated universal integrated circuit card.

11. The device according to claim 1, wherein the second integrated circuit defines a slot intended to receive a universal integrated circuit card.

12. The device according to claim 1, wherein the device is a cell phone.

13. An electronic device comprising:
a modulator-demodulator circuit;
a first integrated circuit implementing a first subscriber identification module; and
a second integrated circuit comprising a second subscriber identification module, wherein a sequencing terminal of the first integrated circuit and a sequencing terminal of the second integrated circuit are coupled to a same sequencing terminal of the modulator-demodulator circuit.

14. The device according to claim 13, wherein a reset terminal of the first integrated circuit and a reset terminal of the second integrated circuit are coupled to a same reset terminal of the modulator-demodulator circuit.

15. The device according to claim 13, wherein a data transmit-receive terminal of the second integrated circuit is coupled to a first data transmit-receive terminal of the first integrated circuit.

16. The device according to claim 15, wherein a second data transmit-receive terminal of the first integrated circuit is coupled to a data transmit-receive terminal of the modulator-demodulator circuit.

17. The device according to claim 16, wherein the first integrated circuit comprises a switch coupling the first data transmit-receive terminal to the second data transmit-receive terminal, further comprising a microcontroller transmitting a signal for controlling the switch.

18. The device according to claim 16, wherein a data transmit-receive terminal of the second integrated circuit is coupled to a first data transmit-receive terminal of the first integrated circuit, and wherein the first integrated circuit comprises a switch coupling the first data transmit-receive terminal to the second data transmit-receive terminal.

19. The device according to claim 13, wherein the sequencing and reset terminals of the modulator-demodulator circuit and of the first and second integrated circuits each form part of a standardized ISO 7816 communication interface.

20. The device according to claim 13, wherein the first integrated circuit is an embedded universal integrated circuit card or an integrated universal integrated circuit card, and wherein the second integrated circuit defines a slot intended to receive a universal integrated circuit card.

* * * * *